US008000876B2

(12) United States Patent
Wesquet et al.

(10) Patent No.: US 8,000,876 B2
(45) Date of Patent: Aug. 16, 2011

(54) FUEL INJECTOR CONTROL

(75) Inventors: Alain Wesquet, Niederpallen (LU);
Peter J. Spadafora, Strassen (LU)

(73) Assignee: Delphi Technologies Holding S.arl, Troy, MI (US)

( * ) Notice: Subject to any disclaimer, the term of this patent is extended or adjusted under 35 U.S.C. 154(b) by 1069 days.

(21) Appl. No.: 11/825,711

(22) Filed: Jul. 9, 2007

(65) Prior Publication Data

US 2008/0027585 A1    Jan. 31, 2008

(30) Foreign Application Priority Data

Jul. 26, 2006 (GB) .................................. 0614855.5

(51) Int. Cl.
*F02D 41/30* (2006.01)
*G06F 17/00* (2006.01)
(52) U.S. Cl. ..................................... 701/103; 239/102.2
(58) Field of Classification Search .......... 701/103–105, 701/115, 101, 102; 123/478, 480, 500–502; 239/88, 89, 585.1, 102.2, 584
See application file for complete search history.

(56) References Cited

U.S. PATENT DOCUMENTS

| 4,499,878 | A | * | 2/1985 | Igashira et al. | 123/478 |
| 5,797,266 | A | * | 8/1998 | Brocard et al. | 60/725 |
| 5,956,945 | A | | 9/1999 | Kumar et al. | |
| 6,487,505 | B1 | | 11/2002 | Mock et al. | |
| 7,027,910 | B1 | | 4/2006 | Javaherian et al. | |
| 7,681,555 | B2 | * | 3/2010 | Hargreaves et al. | 701/105 |
| 2003/0209235 | A1 | | 11/2003 | Javaherian | |
| 2006/0082252 | A1 | | 4/2006 | Allmendinger et al. | |

FOREIGN PATENT DOCUMENTS

| EP | 1139445 | 10/2001 |
| WO | WO 2007/014863 A1 * | 2/2007 |

* cited by examiner

*Primary Examiner* — Hieu T Vo
(74) *Attorney, Agent, or Firm* — Thomas N. Twomey

(57) ABSTRACT

A method of operating a fuel injector having a piezoelectric actuator that is operable by applying an electrical drive pulse thereto to activate and deactivate the injector. The method includes monitoring an electrical characteristic of the actuator during a predetermined time period, determining a time-domain data sample corresponding to the monitored electrical characteristic during the predetermined time period, determining a frequency spectrum signature corresponding to the time-domain data sample, and comparing the frequency spectrum signature of the monitored electrical characteristic to a predetermined frequency spectrum signature indicative of an injector event.

11 Claims, 6 Drawing Sheets

FUEL INJECTOR CONTROL

TECHNICAL FIELD

The invention relates in general to a piezoelectrically actuated fuel injector used in an internal combustion engine. More specifically, the invention relates to a method of monitoring a piezoelectric actuator in order to diagnose injector faults and to calculate operational parameters of the injector.

BACKGROUND TO THE INVENTION

In an internal combustion engine, it is known to use a fuel injector to deliver a charge of fuel into the cylinders of the engine. One type of fuel injector that is particularly suited for precise metering of fuel is a so-called piezoelectric injector. Such an injector allows precise control of the timing and total delivery volume of a fuel injection event. This permits improved control over the combustion process which is beneficial in terms of exhaust emissions.

A known piezoelectric injector 2 and its associated electronic control system 3 is shown schematically in FIG. 1. The piezoelectric injector 2 includes a piezoelectric actuator 4 that is coupled, by way of a hydraulic amplifier 5, to an injector valve needle 6 in order to control the position of the valve needle 6 relative to a valve needle seat 8. As known in the art, the piezoelectric actuator includes a stack 7 of piezoelectric elements that expands and contacts in dependence on the voltage across the stack 7. The axial position, or 'lift' of the valve needle 6 is controlled by applying a variable voltage 'V' to the piezoelectric actuator 4 to control the voltage across the stack 7, thus controlling the transfer of electrical charge applied to or removed from the stack 7. Although not shown in FIG. 1, it should be appreciated that, in practice, the variable voltage would be applied to the actuator 4 by connecting a power supply plug to the terminals of the injector 2.

By application of an appropriate voltage across the actuator 4, the valve needle 6 is caused either to disengage the valve needle seat 8, in which case fuel is delivered into an associated combustion chamber (not shown) through a set of nozzle outlets 10, or is caused to engage the valve needle seat 8, in which case fuel delivery through the outlets 10 is prevented.

The piezoelectric injector 2 is controlled by an injector control unit 20 (hereinafter 'ICU') that forms an integral part of an engine control unit 22 (hereinafter 'ECU'). The ECU 22 monitors a plurality of engine parameters 24 and calculates an engine power requirement signal (not shown) which is input to the ICU 20. In turn, the ICU 20 calculates a required injection event sequence to provide the required power for the engine and operates an injector drive circuit 26 accordingly.

In order to initiate an injection, the injector drive circuit 26 causes the differential voltage between the high and low voltage terminals of the injector, V1 and V2, to transition from a high voltage (typically about 200 V) at which no fuel delivery occurs, to a relatively low voltage (typically about 50 V), which initiates fuel delivery. An injector responsive to this drive waveform is referred to as a 'de-energise to inject' injector and is operable to deliver one or more injections of fuel within a single injection event. For example, the injection event may include one or more so-called 'pre-' or 'pilot' injections, a main injection, and one or more 'post' injections. In general, several such injections within a single injection event are preferred to increase combustion efficiency of the engine.

The amount of charge applied to and removed from the piezoelectric actuator can be controlled by two methods. In a 'charge control' method, current is driven into or out of the piezoelectric actuator for a period of time so as to add or remove, respectively, a demanded amount of change to or from the stack, respectively. Alternatively, in a 'voltage control' method, a current is driven into or out of the piezoelectric actuator until the voltage across the piezoelectric actuator reaches a demanded level. In either case, the voltage across the piezoelectric actuator changes as the level of charge on the piezoelectric actuator varies, and vice versa.

For further background to the invention, an injector of this type is described in the applicant's European Patent No. EP0955901B. Such fuel injectors may be employed in compression-ignition (diesel) engines or spark ignition (petrol) engines.

FIG. 2 is a graph that shows the actuator voltage (or 'drive pulse') during a main injection when driven by the injector drive circuit 26. The actuator voltage includes a discharge phase (between time period T1 and T2), a dwell period (between T2 and T3), and a charge phase (between T3 and T4). It should be appreciated, however, that such an injection could also include one or more 'pre-' or 'pilot' injection events, and/or one or more 'post' injection events.

Piezoelectric injectors provide accurate control over the volume of fuel that is delivered during an injection event and enable precise repeatability between one injection event and another. However, at present piezoelectric injectors are operated to open and close without any information regarding the axial position of the valve needle. Therefore, in order for the ECU to define the instant of the start and the end of an injection event, the ECU is required to perform calculations to compute the necessary duration of the injector drive pulse to deliver a given volume of fuel. The calculated injector drive pulse duration is based on the known dynamic behaviour of the valve needle and the prevailing engine operating conditions such as injection fuel pressure, fuel temperature, engine speed and the like. However, the accuracy with which the ECU is able to calculate the onset of valve needle movement following an injector discharge phase is highly susceptible to the effects of actuator aging and this presents a problem to the long term viability of a piezoelectric injector.

There is therefore a need to provide a means to feedback information to the ECU of a vehicle regarding the operation status of the fuel injectors so that the effects of piezoelectric aging of the actuator of the injector can be mitigated.

SUMMARY OF THE INVENTION

Against this background, a first aspect of the invention provides a method of operating a fuel injector having a piezoelectric actuator operable by applying an electrical drive pulse thereto to activate and deactivate said injector. The method includes monitoring an electrical characteristic of the actuator during a predetermined time period, determining a time-domain data sample corresponding to the monitored electrical characteristic during the predetermined time period, determining a frequency spectrum signature corresponding to the time-domain data sample, and comparing the frequency spectrum signature of the monitored electrical characteristic to a predetermined electrical frequency spectrum signature indicative of an injector event.

The operation of the injector during an injection event creates pressure waves through the fuel passages of the injector, and mechanical vibrations in the injector components, that affect the actuator voltage. The applicant has identified that the voltage fluctuations have a specific frequency spectrum characteristic, or 'spectral density signature', such that information regarding the operational parameters of the injector can be determined by comparing the calculated spectral density signatures with known spectral density signatures that are indicative of certain injector behaviour. Put another way, in the present invention the actuator operates as a sensor to detect pressure wave activity in the injector fuel passageways and mechanical vibrations/resonances of the injector components.

Hereinafter, the use of the term spectral density will be taken to be synonymous with the term frequency spectrum.

In a preferred embodiment, the step of monitoring the electric characteristic during the predetermined time period comprises monitoring the actuator voltage for a predetermined time period after the injector is deactivated (e.g. following an actuator charge phase). However, the monitoring step may also take place after the injector is activated (e.g. following a discharge phase).

Although certain operational behaviours may be determined from monitoring the actuator voltage following application of a single drive pulse, in a preferred embodiment the invention includes applying a plurality of electrical drive pulses to the actuator, each successive drive pulse having an increased duration relative to the preceding drive pulse, monitoring the electrical characteristic of the actuator after the application of each electrical drive pulse so as to provide a plurality of time-domain data samples, determining a frequency spectrum signature of each of the plurality of time-domain data samples and comparing each of the plurality of frequency spectrum signatures at a predetermined frequency of interest such that the electrical drive pulse having a minimum duration necessary to initiate an injection event is determined.

In one embodiment, the comparing step may include determining whether the signal amplitude of each of the frequency spectrum signatures exceeds a predetermined threshold and the minimum delivery pulse may be identified by determining the electrical drive pulse having the shortest duration which exceeds the predetermined threshold.

According to a second aspect of the invention there is provided a computer program product comprising at least one computer program software portion which, when executed in an executing environment, is operable to implement the method of the first aspect of the invention.

According to a third aspect the invention provides a data storage medium having the or each computer software portion according to the second aspect of the invention stored thereon.

According to a fourth aspect there is provided a microcomputer having a data storage medium according to the third aspect of the invention.

According to a fifth aspect of the invention, there is provided apparatus including a fuel injector having a piezoelectric actuator that is coupled to an injector valve needle and is arranged to impart movement to the valve needle in dependence on an actuator electrical drive pulse, and a controller arranged to apply the electrical drive pulse to the piezoelectric actuator, wherein the controller is operable to monitor the actuator voltage and/or the actuator current in order to sense pressure wave activity and/or mechanical vibrations of the injector.

BRIEF DESCRIPTION OF THE DRAWINGS

Reference has already been made to FIG. 1 which is a schematic representation of a known piezoelectric injector 2 and its associated control system, and FIG. 2 which shows a typical drive pulse waveform for a 'discharge-to-inject' piezoelectric injector. In order that it may be more readily understood, the invention will now be described with reference also to the following figures, in which.

DETAILED DESCRIPTION OF THE PREFERRED EMBODIMENTS

Figure 1:
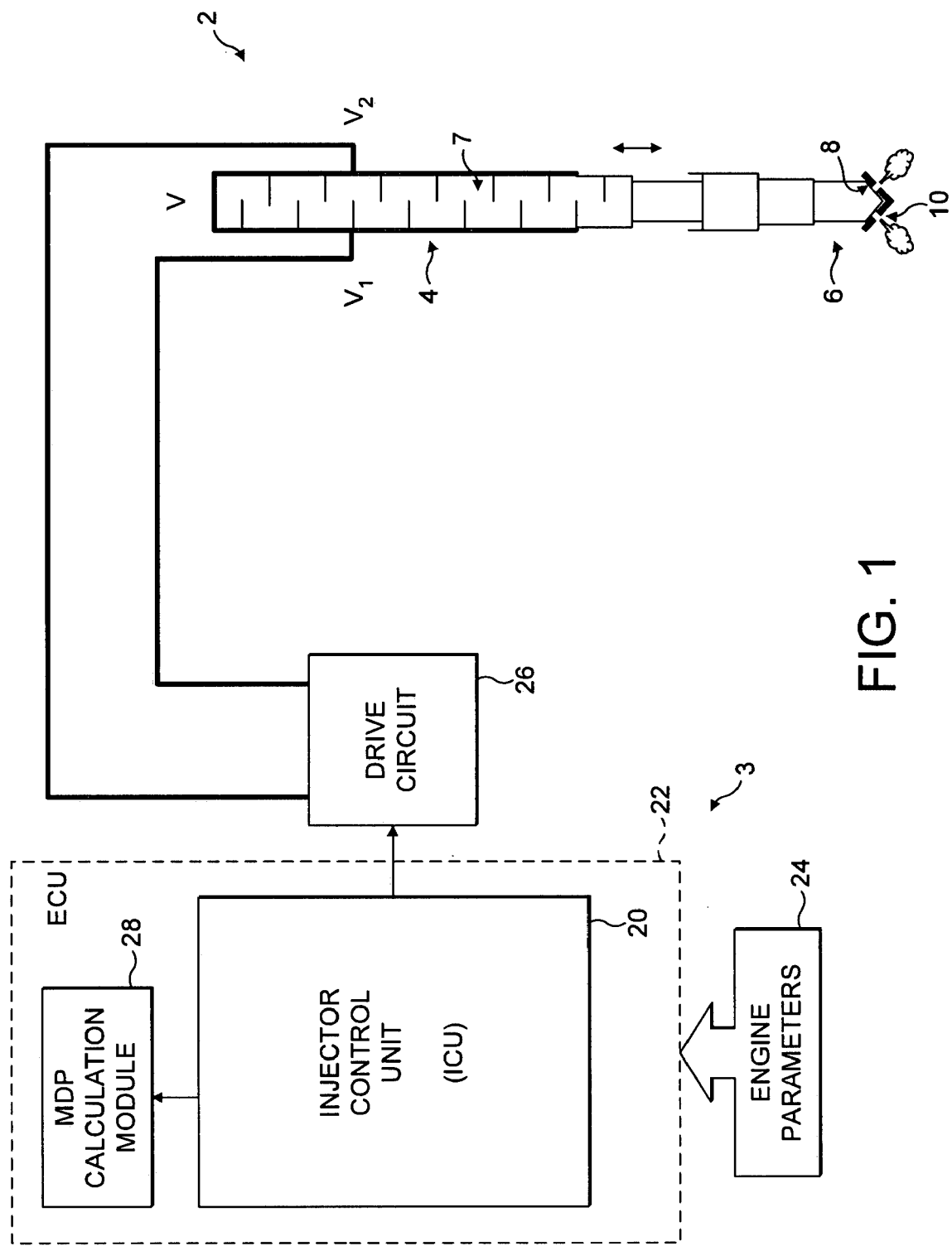
Figure 2:
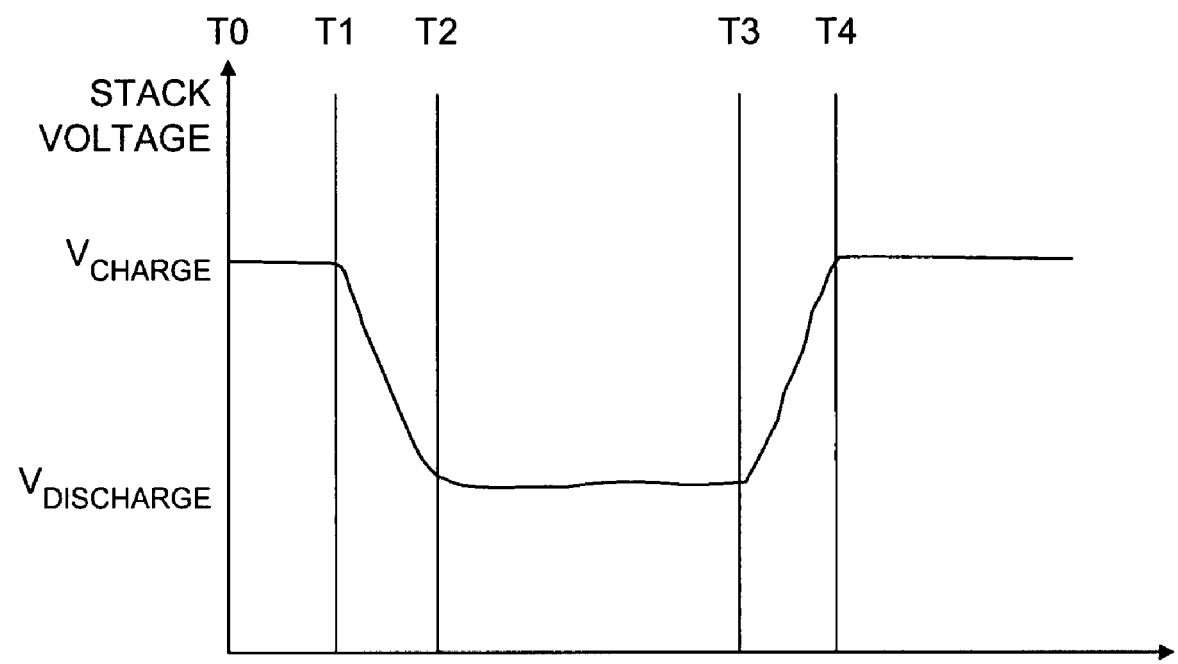
Figure 3:
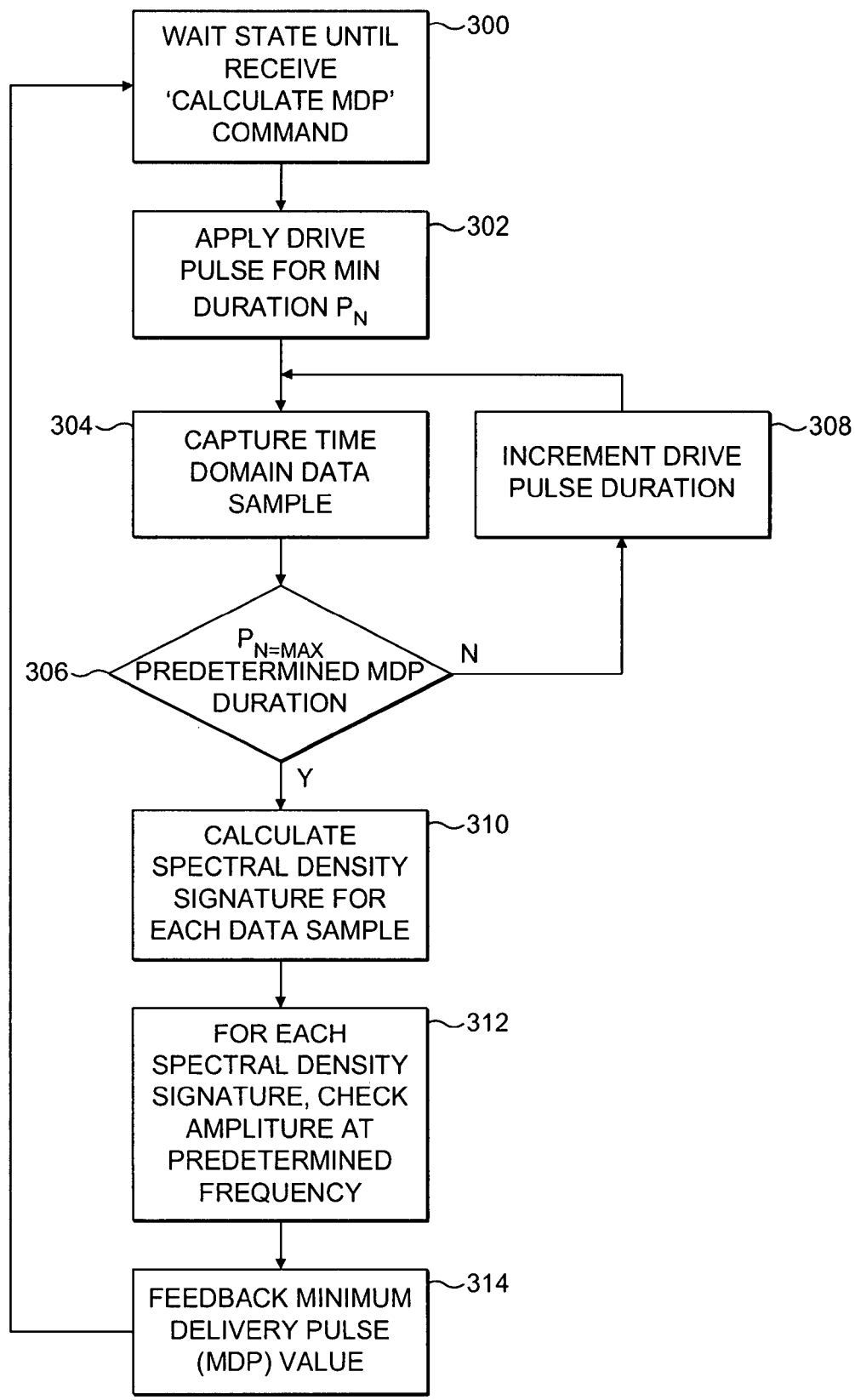
FIG. 3 is a flowchart in accordance with an embodiment of the invention.

The algorithm of FIG. 3 is embodied in an MDP calculation module 28, as shown in FIG. 1, which is integral to the ECU 22. The MDP calculation module 28 provides a method of determining the minimum injector drive pulse that is required to initiate movement of the valve needle in order to inject fuel into its associated combustion chamber. The minimum drive pulse is an important parameter to determine accurately in order to enable control over the injected fuel quantity. For instance, once a unique minimum delivery pulse has been calculated for each injector within the engine, a further pulse of a predetermined length can be applied to each calculated minimum delivery pulse to obtain an invention event to deliver a demanded volume of fuel. The delivery volume of each injector is therefore substantially equal.

Although the MDP calculation module 28 is shown as part of the ECU 22 in FIG. 1, it should be mentioned at this point that this it is not essential to the invention and that the MDP calculation module 28 could instead be embodied in a calculating unit that is physically separated from the ECU 22.

In FIG. 3, at step 300 the MDP calculation module 28 is in a wait state, in which it waits for a command signal (not shown) from the ECU 22 to initiate the process to calculate the minimum delivery pulse.

Following receipt of the command signal from the ECU 22 the MDP calculation module 28 begins the data acquisition process to gather data from which the minimum delivery pulse can be calculated. The MDP calculation module 28 calculates a series of five short injector drive pulses P1 to P5 that are applied to the injector sequentially. The duration of each drive pulse increases in length by 1 microsecond. The minimum duration drive pulse P1 is selected to be too short to cause the valve needle 6 to lift from the valve needle seat 8 such that no fuel is injected. In contrast, the maximum duration drive pulse P5 is selected to be of sufficient duration to lift the valve needle 6 from the seat 8 and thus cause an injection of fuel. It should be mentioned at this point that the incremental duration of 1 microsecond for successive drive pulses is exemplary only.

In this embodiment, the MDP calculation module 28 applies the first drive pulse (having the smallest duration of all the drive pulses) to the injector at step 302. Following the application of the first drive pulse P1, the MDP calculation module 28 monitors the actuator voltage and captures a time-domain data sample at step 304 for use later in the process.

At decision step 306, the MDP calculation module 28 checks to see if the previous drive pulse was the maximum duration drive pulse. If the answer to the check step 306 is negative, the process loops through step 308 which increments the drive pulse duration by a predetermined amount (for example 1 microsecond) and applies the next drive pulse at step 302. The process loops through steps 302, 304, 306 and 308 until all the predetermined drive pulses P1 to P5 have been applied to the injector and the resulting time-domain data samples has been captured.

Figure 4:
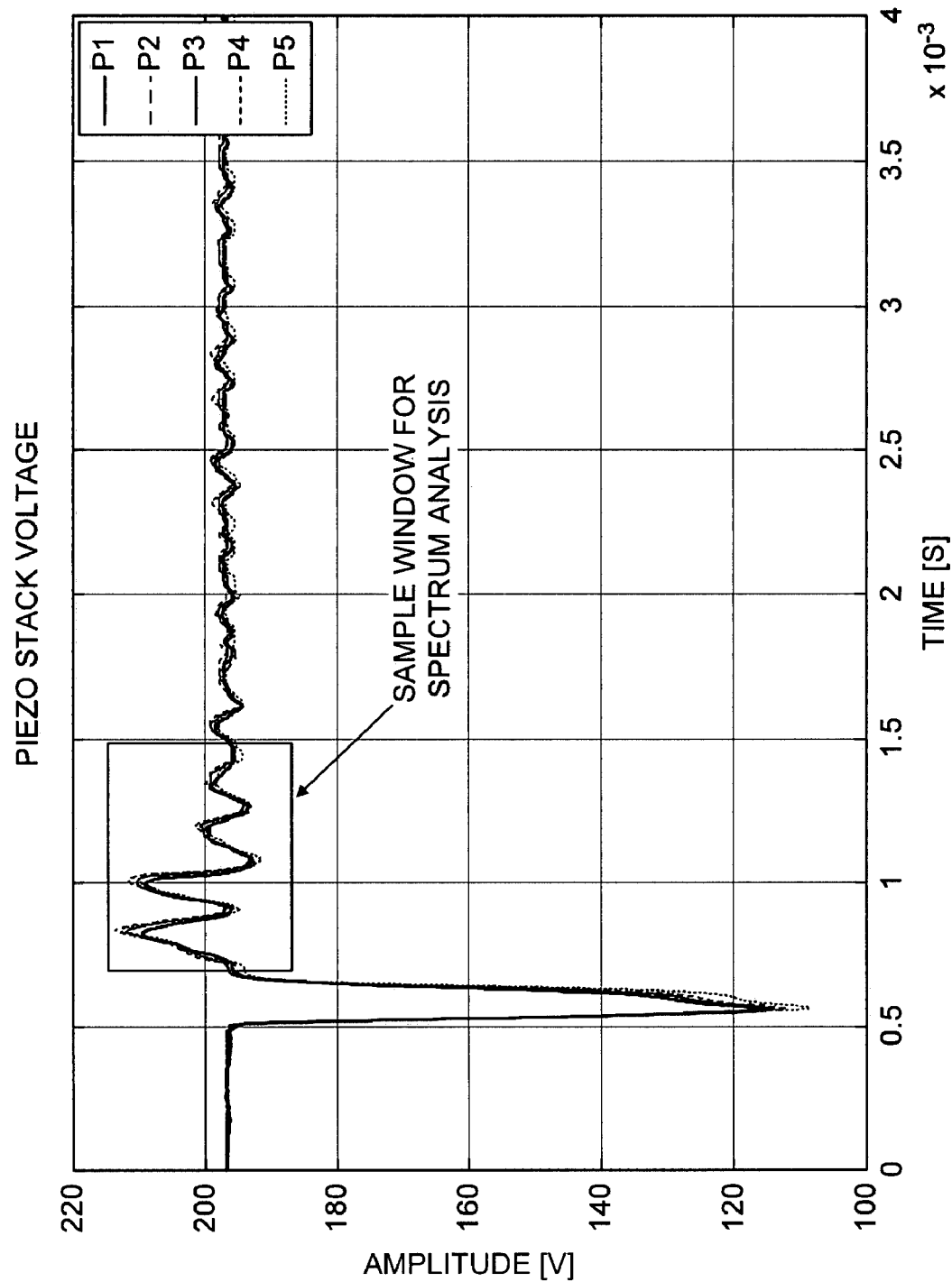
FIG. 4 is a graph of actuator voltage against time corresponding to a plurality of drive pulses.
Figure 5:
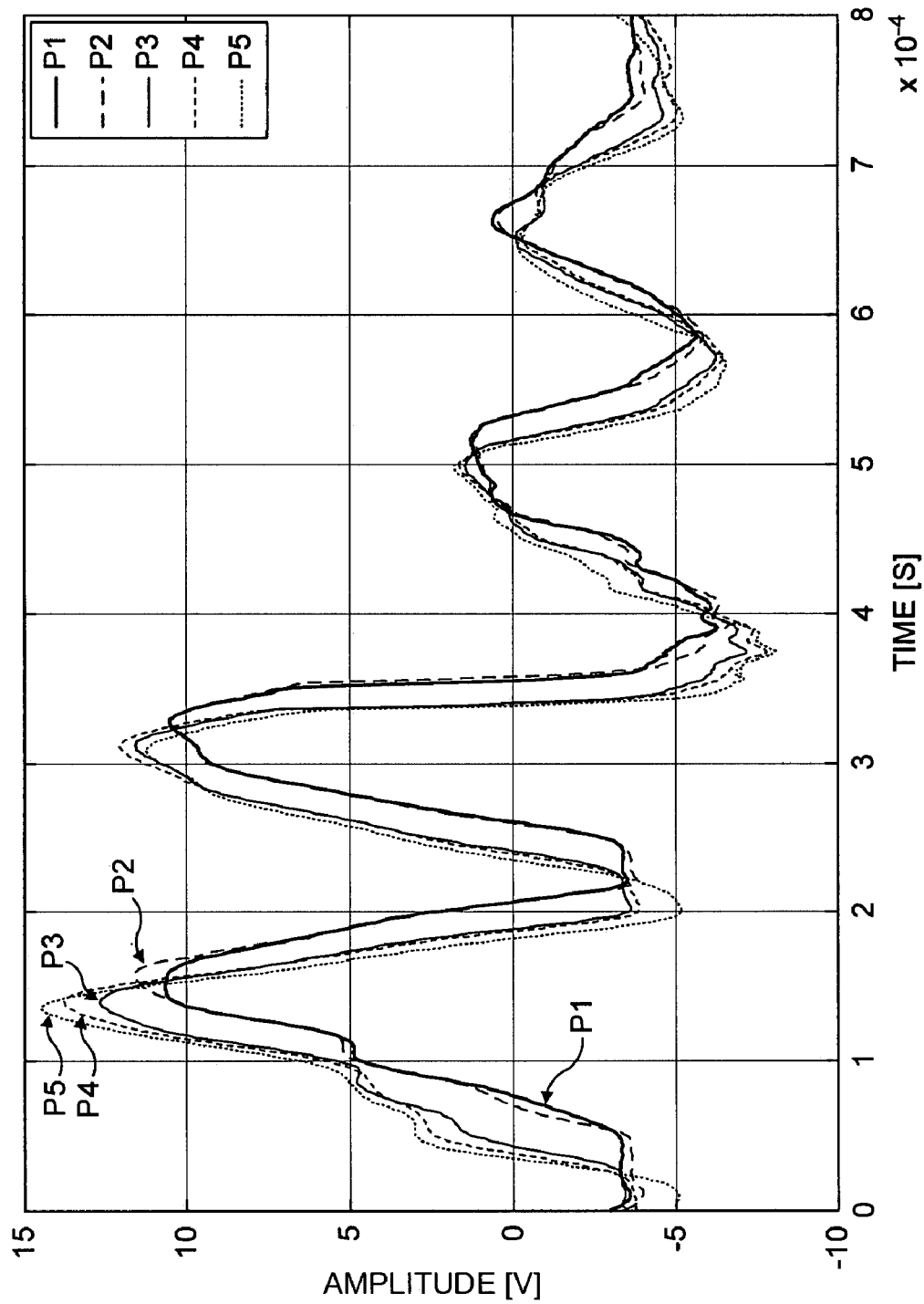
FIG. 5 is an enlarged view of the graph in FIG. 4.

In FIG. 4, a data sample window 402 illustrates the area of focus of the data capture step 306, and in FIG. 5 the data samples of drive pulses P1 to P5 in the region of the data sample window 402 are shown in more detail. As can be seen, at the end of the actuator charge period, the actuator voltage oscillates around the charged voltage level (nominally 200 V) for approximately 3.0 ms.

Referring again to FIG. 3, at step 310, the MDP calculation module 28 operates on the collected time-domain data samples P1 to P5 to calculate the frequency composition against amplitude (hereinafter 'spectral density signature') of each data sample, for example by way of Fast Fourier Transform (FFT) analysis.

Figure 6:
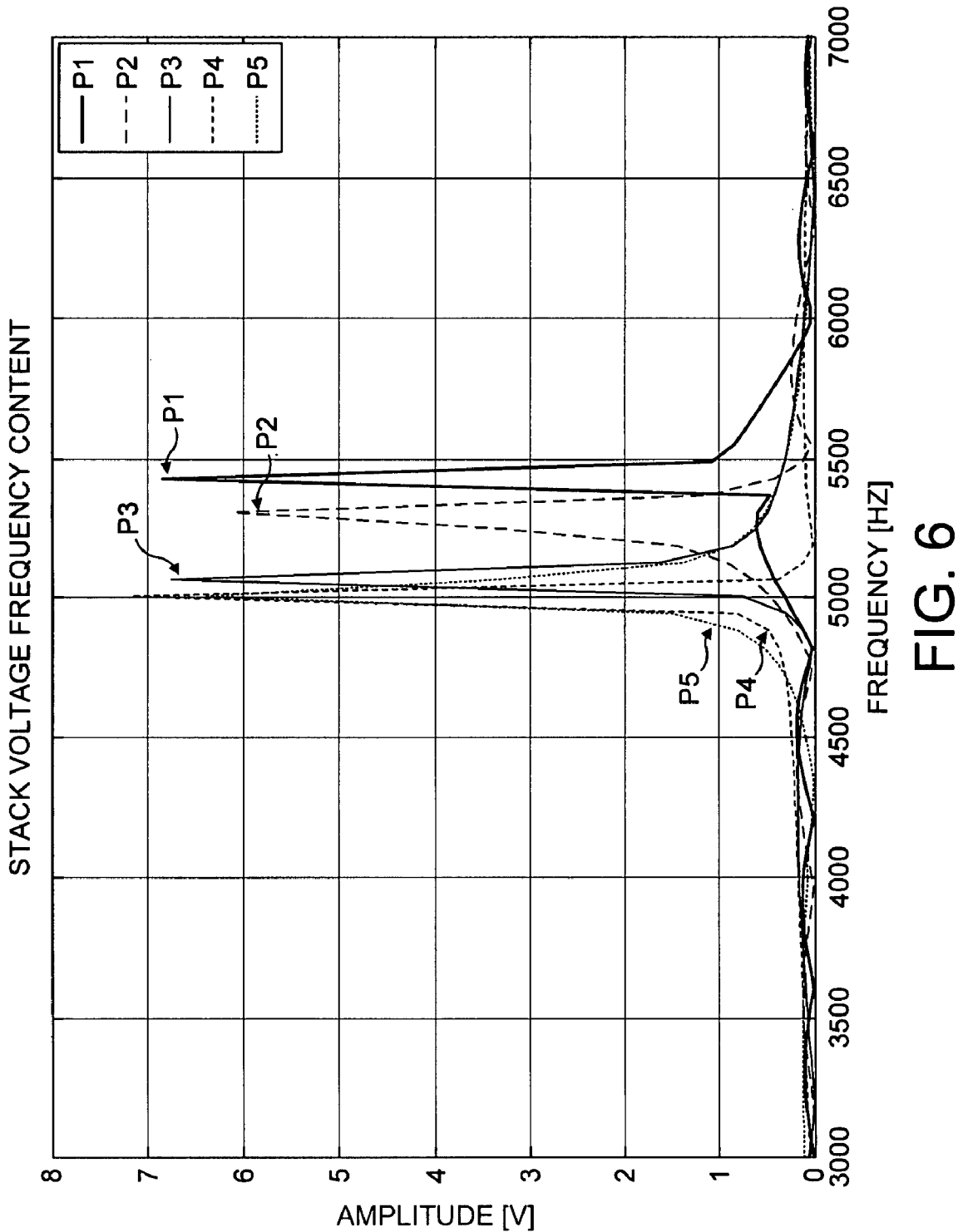
FIG. 6 is a spectral density graph for each of the voltage against time graphs in FIG. 5.

FIG. 6 shows the spectral density signature for each of the data samples P1 to P5. As can be seen, the spectral density signatures of each data plot P1 to P5 resolve the time-domain data sample into plots that define the voltage amplitude at a range of frequency components (in this case between about 4 kHz to about 6.5 kHz).

At step 312, the MDP calculation module 28 checks the amplitude of each of the spectral density signatures P1 to P5 at a predetermined frequency range, for example between 5 kHz and 5.2 kHz. At the frequency range of interest, the MDP calculation module 28 checks if the signal amplitude of each spectral density signature is above or below a predetermined threshold, for example 6 Volts.

By way of explanation, it can be seen that the spectral density signatures P1 and P2 have an amplitude peak of about 6 to 7 Volts at approximately 5.3 kHz and 5.4 kHz, respectively. However, the amplitude peaks for spectral density signatures P3, P4 and P5 occur at a lower frequency, 5 kHz and 5.1 kHz respectively.

The shift in amplitude peak is a result of the vibration generated by pressure waves within the injector and mechanical resonances of the stack as the valve needle is caused to lift from the valve seat permitting an injection of fuel. The MDP calculation module 28 therefore analyses the spectral density signatures P1 to P5 for the drive pulse of the shortest duration that also gives rise to a high amplitude frequency signal in the range of interest. In this case, drive pulse P3 has a shorter duration than drive pulses P4 and P5 and has a greater amplitude of approximately 6.5 Volts at a frequency of approximately 5.1 kHz.

At step 314, the MDP calculation module 28 feeds back the calculated minimum drive pulse (P3) to the ECU 22 and returns to the wait step 300 ready to calculate the minimum drive pulse once again following an appropriate command signal from the ECU 22.

It will be appreciated that various modifications may be made to the embodiment described above without departing from the scope of the invention, as defined by the claims. For example, the above example of calculating the minimum delivery pulse to initiate injection is exemplary of the utility of the invention and is not intended to be limiting. Thus, it should be appreciated that the invention could also be used to identify the exact timing of other injector phenomena from vibration nodes of the injector generated from fuel pressure wave activity in the injector fuel passages and/or mechanical resonances of the injector components. Examples of such phenomena are the start of valve needle lift and valve needle closure. The inventive concept also has use in determining the mechanical/hydraulic amplification transition point in an injector of the type having a mechanical and a hydraulic coupling between the actuator and the valve needle, for example as described in EP0955901B.

With respect to the embodiment described above, it should be noted that the range of five drive pulses P1 to P5 used in the above embodiment is exemplary only and a greater or lesser number may be used if desired. For example, if an increased accuracy is required, a higher number of drive pulses could be used, each having a smaller increase in duration, thus providing increased resolution.

Also, although it is described that the time-domain data in connection with each and every delivery pulse is captured prior to calculating the respective spectral density signatures, this need not be the case. Alternatively, the spectral density signature for each drive pulse may be calculated in turn, before applying the next drive pulse.

Furthermore, although the actuator voltage is monitored in the above example, this is not essential and the invention also encompasses monitoring other electrical characteristics. For example, the same information about the pressure wave activity and resonances within the injector is derivable from monitoring the injector current if the actuator was controlled on the basis of constant voltage.

The invention claimed is:

1. A method of operating a fuel injector having a piezoelectric actuator operable by applying an electrical drive pulse thereto to activate and deactivate said injector, the method comprising:
   monitoring an electrical characteristic of the actuator during a predetermined time period,
   determining a time-domain data sample corresponding to the electrical characteristic monitored during the predetermined time period,
   determining a frequency spectrum signature corresponding to the time-domain data sample, and
   comparing the frequency spectrum signature of the monitored electrical characteristic to a predetermined frequency spectrum signature indicative of an injector event.

2. The method of claim 1, wherein the step of monitoring the electrical characteristic during the predetermined time period comprises monitoring the actuator voltage and/or the actuator current for a predetermined time period after the injector is activated.

3. The method of claim 1, wherein the step of monitoring the electrical characteristic during the predetermined time period comprises monitoring the actuator voltage and/or the actuator current for a predetermined time period after the injector is deactivated.

4. The method of claim 1, including:
   applying a plurality of electrical drive pulses (P1, P2, P3, P4, P5) to the actuator, each successive electrical drive pulse having an increased duration relative to the preceding electrical drive pulse,
   monitoring the electrical characteristic of the actuator after the application of each electrical drive pulse so as to provide a plurality of time-domain data samples,
   determining a frequency spectrum signature of each of the plurality of time-domain data samples, and
   comparing each of the frequency spectrum signatures at a predetermined frequency of interest to determine the minimum delivery pulse necessary to initiate an injection event.

5. The method of claim 4, wherein the comparing step includes determining whether the signal amplitude of each of the frequency spectrum signatures exceeds a predetermined threshold.

6. The method of claim 5, wherein the minimum delivery pulse is identified by determining the electrical drive pulse having the shortest duration which exceeds the predetermined threshold.

7. The method of claim 4, wherein the step of determining the frequency spectrum signatures is carried out after all of the electrical drive pulses have been monitored to provide the time-domain data samples.

8. The method of claim 4, wherein the step of determining the frequency spectrum signature of each of the time-domain data samples is carried out for each of the electrical drive pulses, in turn, before a subsequent electrical drive pulse is monitored.

9. The method of claim 1, wherein the electrical characteristic is a voltage across the actuator.

10. A method of operating a fuel injector having a piezoelectric actuator operable by applying an electrical drive pulse thereto to activate and deactivate said injector, the method comprising:
  applying a plurality of electrical drive pulses (P1, P2, P3, P4, P5) to the actuator, each successive electrical drive pulse having an increased duration relative to the preceding electrical drive pulse,
  monitoring the electrical characteristic of the actuator during a predetermined time period after the application of each electrical drive pulse,
  determining a respective time-domain data sample corresponding to the electrical characteristic monitored during the predetermined time period after the application of each electrical drive pulse, determining a frequency spectrum signature of each of the time-domain data samples, and
  comparing each of the frequency spectrum signatures at a predetermined frequency of interest to determine the minimum delivery pulse necessary to initiate an injection event.

11. Apparatus including a fuel injector having a piezoelectric actuator that is coupled to an injector valve needle and is arranged to impart movement to the valve needle in dependence on an actuator voltage/current, and a controller that is arranged to apply an electrical drive signal to the piezoelectric actuator, wherein the controller is operable to monitor the actuator voltage and/or the actuator current in order to sense pressure wave activity and/or mechanical vibrations of the injector.

* * * * *